(12) United States Patent
Takegawa et al.

(10) Patent No.: US 12,512,865 B2
(45) Date of Patent: Dec. 30, 2025

(54) SEMICONDUCTOR DEVICE AND IMPEDANCE-MATCHING CIRCUITRY

(71) Applicant: Renesas Electronics Corporation, Tokyo (JP)

(72) Inventors: Kyoya Takegawa, Tokyo (JP); Kenichi Shibata, Tokyo (JP); Hiroaki Matsui, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 384 days.

(21) Appl. No.: 18/169,973

(22) Filed: Feb. 16, 2023

(65) Prior Publication Data
US 2023/0261679 A1 Aug. 17, 2023

(30) Foreign Application Priority Data

Feb. 16, 2022 (JP) .................. 2022-022166

(51) Int. Cl.
*H04B 1/04* (2006.01)
*H03H 7/38* (2006.01)
*H04B 1/18* (2006.01)

(52) U.S. Cl.
CPC ............. *H04B 1/0458* (2013.01); *H03H 7/38* (2013.01); *H04B 1/18* (2013.01)

(58) Field of Classification Search
CPC .......... H04B 1/40; H04B 1/0475; H04B 1/04; H04B 7/0617; H04B 2001/0416; H04B 13/005; H04B 1/0458; H04B 1/48; H04B 7/0413; H04B 1/44; H04B 2001/045; H04B 2001/0408
USPC ........................................................ 455/78
See application file for complete search history.

(56) References Cited

U.S. PATENT DOCUMENTS

| | | | |
|---|---|---|---|
| 2014/0315501 A1* | 10/2014 | Rudell ................. | H04B 1/0458 455/78 |
| 2018/0131333 A1* | 5/2018 | Cabanillas ............ | H03F 1/0272 |
| 2023/0274874 A1* | 8/2023 | Inao .................... | H01F 27/2828 336/192 |

FOREIGN PATENT DOCUMENTS

EP 3772184 A1 3/2021

* cited by examiner

*Primary Examiner* — Ajibola A Akinyemi
(74) *Attorney, Agent, or Firm* — SCULLY, SCOTT, MURPHY & PRESSER, P.C.

(57) ABSTRACT

A semiconductor device includes: a first terminal connected to an antenna; a second terminal connected to an input terminal of a receiving circuitry; a third terminal connected to an output terminal of a transmitting circuitry; a first inductor arranged in a signal path extending from the first terminal to the second terminal; and a second inductor arranged in a signal path extending from the first terminal to the third terminal, and the first inductor and the second inductor are formed so as to have at least a partial overlapping portion in plan view.

8 Claims, 15 Drawing Sheets

FIG. 3
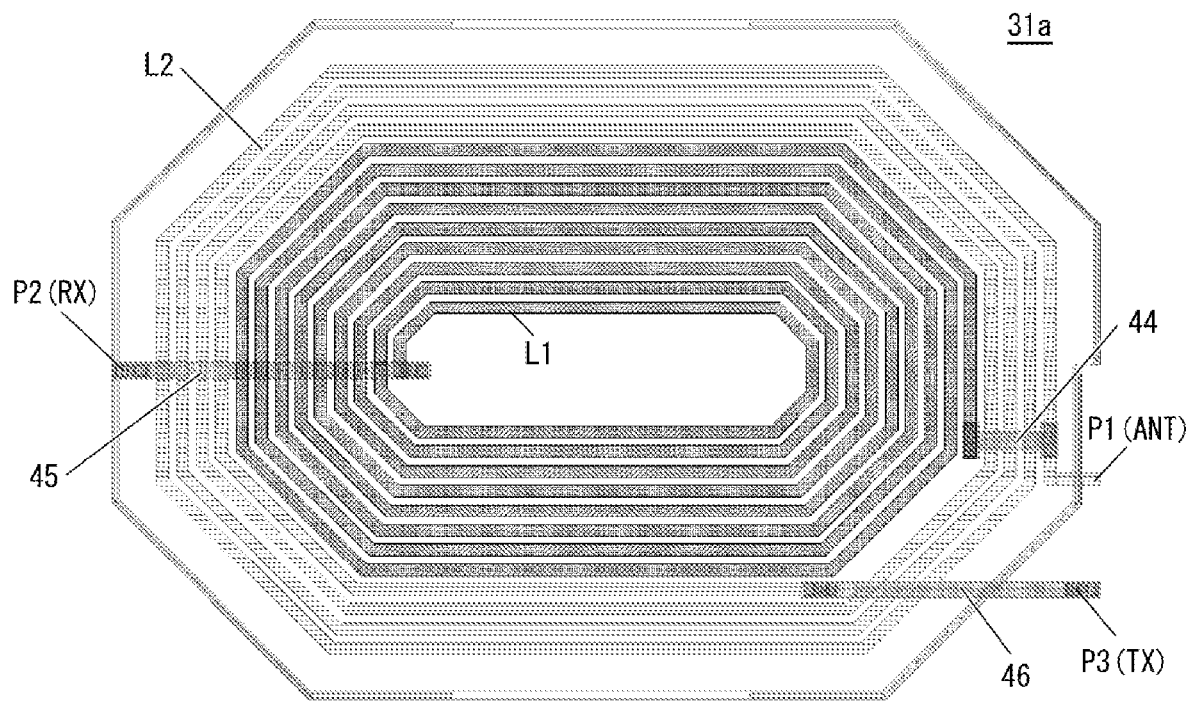
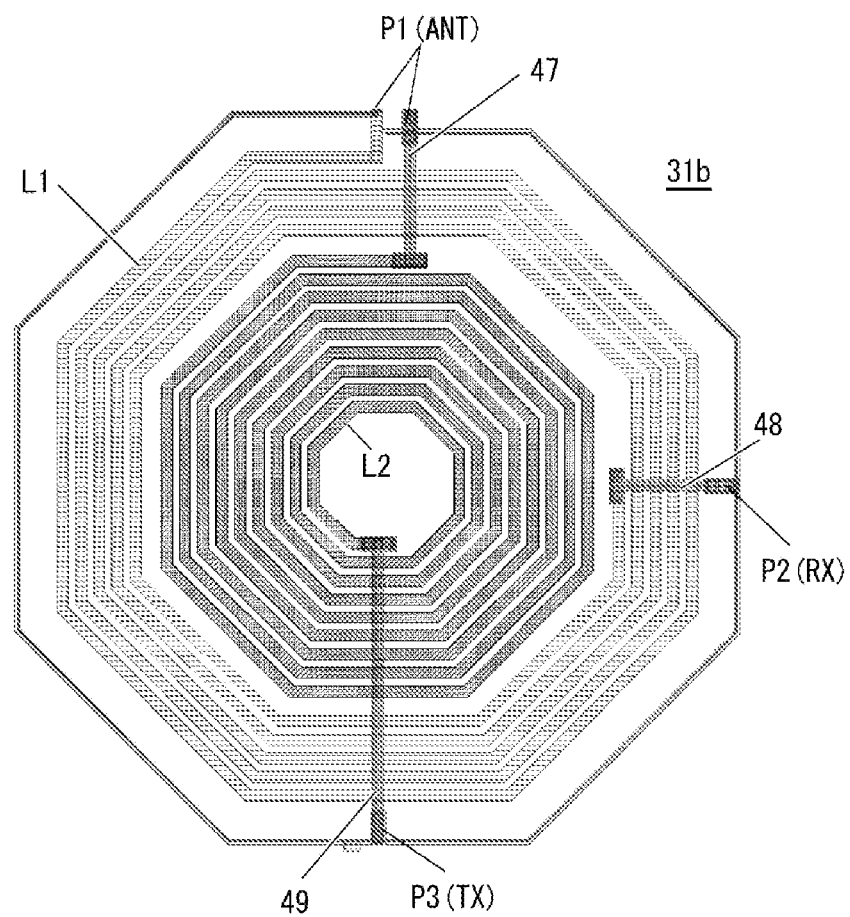

FIG. 4
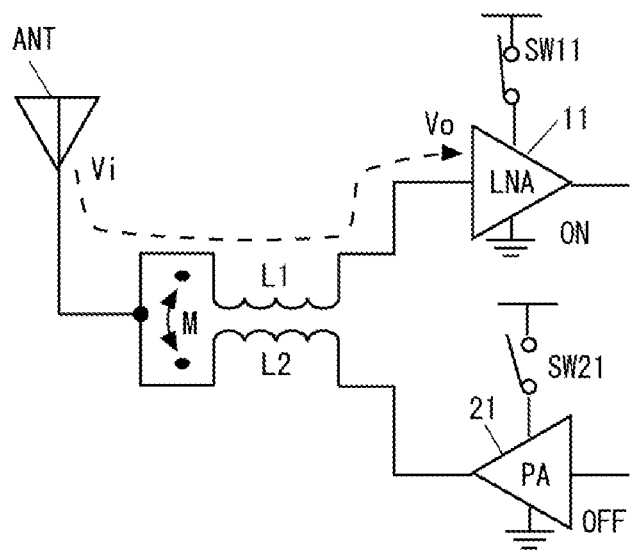
EQUIVALENT CIRCUITRY
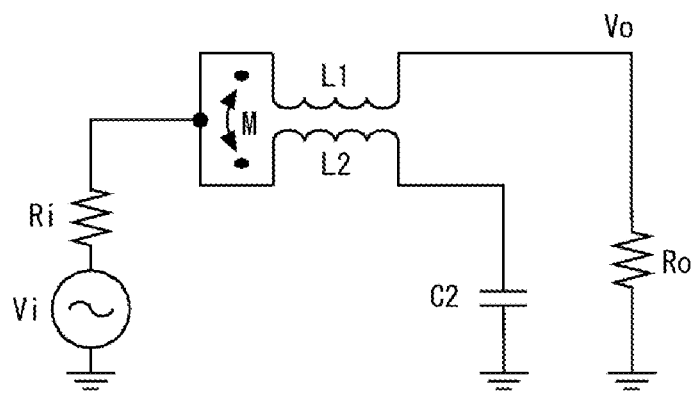

FIG. 5
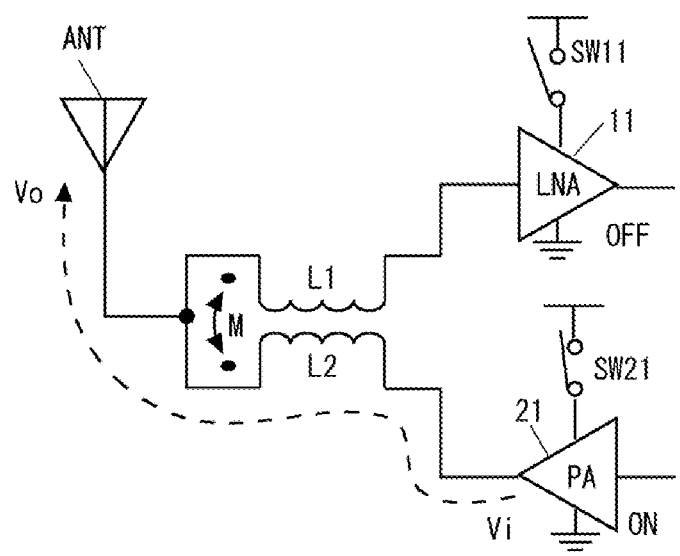
EQUIVALENT CIRCUITRY
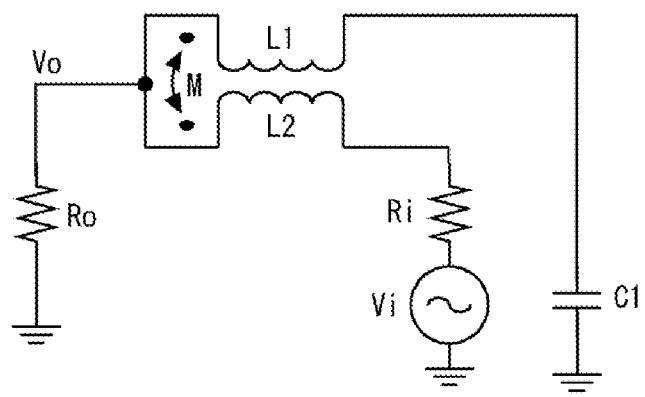

SEMICONDUCTOR DEVICE AND IMPEDANCE-MATCHING CIRCUITRY

CROSS-REFERENCE TO RELATED APPLICATION

The subject application claims priority under 35 U.S.C. § 119 to Japanese Patent Application No. 2022-022166, filed on Feb. 16, 2022. The disclosure of Japanese Patent Application No. 2022-022166 including the specification, drawings and abstract is incorporated herein by reference in its entirety.

BACKGROUND

The present invention relates to a semiconductor device and an impedance-matching circuitry, and relates to, for example, an impedance-matching circuitry used for an antenna and a semiconductor device including the impedance-matching circuitry.

There is a disclosed technique listed below.
[Patent Document 1] European Patent Application Publication No. 3772184

In recent years, wireless-communication has been actively used, and antennas and signal transmitting/receiving circuitries used for the wireless-communication are mounted on a lot of apparatuses. For example, the Patent Document 1 discloses a technique related to a transmitting/receiving device including an impedance-matching circuitry for matching an impedance of an antenna and an impedance of the transmitting/receiving circuitry.

The impedance-matching circuitry of the transmitting/receiving circuitry described in the Patent Document 1 is an on-chip matching circuitry in which one inductor is shared between a transmitter and a receiver. Therefore, in the Patent Document 1, a circuitry area that is necessary for the inductor having a large circuitry area is reduced.

SUMMARY

However, the technique described in the Patent Document 1 has a problem that is difficulty in increase of a signal gain since a switch SW0 for switching a usage method of one inductor causes a signal loss in both operation modes that are a reception mode and a transmission mode.

Other objects and novel characteristics will be apparent from the description of the present specification and the accompanying drawings.

According to one embodiment, a semiconductor device and an impedance-matching circuitry includes: a first terminal connected to an antenna; a second terminal connected to an input terminal of a receiving circuitry; a third terminal connected to an output terminal of a transmitting circuitry; a first inductor arranged in a signal path extending from the first terminal to the second terminal; and a second inductor arranged in a signal path extending from the first terminal to the third terminal. The first inductor and the second inductor are formed so as to have at least a partial overlapping portion in plan view.

According to the one embodiment, in the semiconductor device and the impedance-matching circuitry, a circuitry area can be reduced while decrease of a signal gain is prevented.

BRIEF DESCRIPTIONS OF THE DRAWINGS

FIG. 3 is an explanatory diagram of another example of the layout of the inductor according to the first embodiment.

FIG. 4 is an explanatory diagram of an operation of the semiconductor device in a reception mode according to the first embodiment.

FIG. 5 is an explanatory diagram of an operation of the semiconductor device in a transmission mode according to the first embodiment.

DETAILED DESCRIPTION

For clearly describing the explanation, the following descriptions and drawings will be appropriately omitted and simplified. In each drawing, the same component is denoted with the same sign, and the overlapping explanation is omitted if needed.

Figure 1:
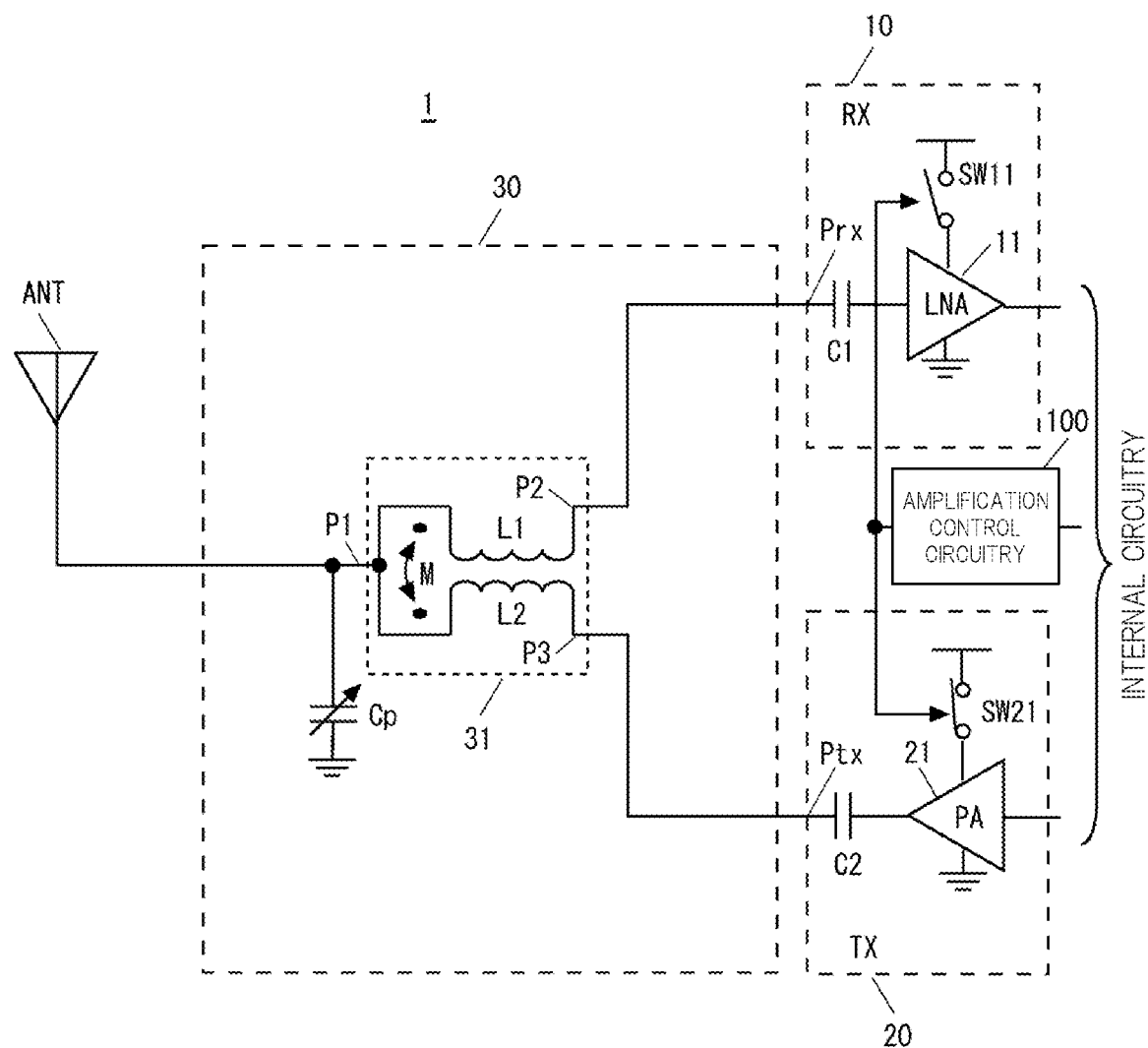
FIG. 1 is a circuitry diagram of a semiconductor device according to a first embodiment.

FIG. 1 shows a circuitry diagram of a semiconductor device according to a first embodiment. As shown in FIG. 1, a semiconductor device 1 includes a receiving circuitry 10, a transmitting circuitry 20, and an impedance-matching circuitry 30. And, the semiconductor device 1 achieves transmission/reception of wireless signals by using an antenna ANT.

The receiving circuitry 10 amplifies and transmits a signal received by the antenna ANT to a latter-stage circuitry (such as an internal circuitry). The transmitting circuitry 20 amplifies a signal that is generated in the internal circuitry, and outputs the wireless signal from the antenna ANT by driving the antenna ANT. Then, in the semiconductor device 1, impedances of the receiving circuitry 10 and the transmitting circuitry 20 are matched with each other by using an impedance of the antenna ANT and the impedance-matching circuitry 30.

The receiving circuitry 10 includes an input terminal Prx, a receiving amplifier 11, a power switch SW11 and a capacitor C1. The input terminal Prx is a terminal for receiving a signal from the impedance-matching circuitry 30. In the receiving circuitry 10, a signal that is input from the input terminal Prx is supplied to the receiving amplifier 11 through the capacitor C1. The receiving amplifier 11 amplifies and outputs the supplied signal to the internal circuitry. In the receiving circuitry 10, power is supplied to the receiving amplifier 11 through the power switch SW11. The power switch SW11 switches power supply and interruption to the receiving amplifier 11 in accordance with an instruction issued from an amplifier control circuit 100.

The transmitting circuitry 20 includes an out terminal Ptx, a transmitting amplifier 21, a power switch SW21 and a capacitor C2. The output terminal Ptx is a terminal for outputting a transmission signal output to the antenna ATN through the impedance-matching circuitry 30. In the transmitting circuitry 20, a signal that is input from the internal circuitry is amplified and output from the output terminal Ptx through the capacitor C2. The transmitting amplifier 21 amplifies and outputs the supplied signal to the impedance-matching circuitry 30 and the antennal ANT. In the transmitting circuitry 20, power is supplied to the transmitting amplifier 21 through the power switch SW21. The power switch SW21 switches power supply and interruption to the transmitting amplifier 21 in accordance with an instruction issued from the amplifier control circuit 100.

The amplifier control circuit 100 exclusively operates the receiving amplifier 11 of the receiving circuitry 10 and the transmitting amplifier 21 of the transmitting circuitry 20.

In this case, one of features of the semiconductor device 1 according to the first embodiment is the impedance-matching circuitry 30, and therefore, the impedance-matching circuitry 30 will be explained in detail below. The impedance-matching circuitry 30 includes an inductor 31 and a first variable capacity Cp. The inductor 31 includes: a first terminal P1 connected to the antenna; a second terminal P2 connected to the input terminal Prx of the receiving circuitry 10; and a third terminal P3 connected to the output terminal Ptx of the transmitting circuitry 20. And, the impedance-matching circuitry 30 includes: a first inductor L1 arranged in a signal path extending from the first terminal P1 to the second terminal P2; and a second inductor P2 arranged in a signal path extending from the first terminal P1 to the third terminal P3. In the impedance-matching circuitry 30, the first variable capacity Cp is connected between the first terminal P1 and a fixed potential terminal (that is a ground terminal in FIG. 1) having a fixed potential in terms of an alternating current.

Since the impedance-matching circuitry 30 according to the first embodiment is configured so that the first inductor L1 and the second inductor L2 include a mutual inductance M, the loss of the signal gain of the signal that passes the impedance-matching circuitry 30 and the circuitry area can be reduced.

Figure 2:
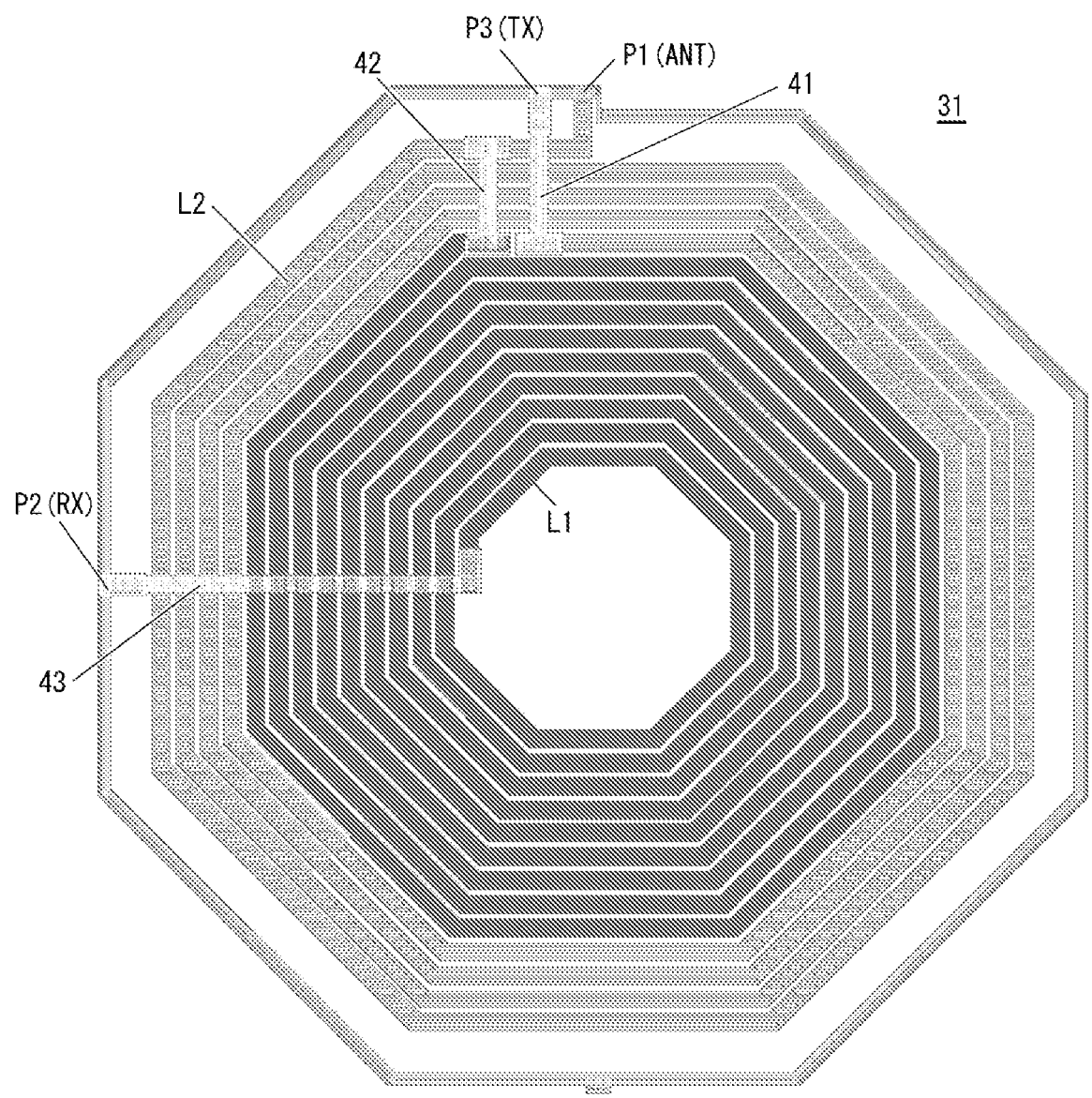
FIG. 2 is an explanatory diagram of a layout of an inductor according to the first embodiment.

Accordingly, a structure of the inductor 31 will be explained first. FIG. 2 shows an explanatory diagram of a layout of the inductor according to the first embodiment. As shown in FIG. 2, in the inductor 31, spiral-form wirings configuring the first inductor L1 and the second inductor L2 are concentrically formed. In the example shown in FIG. 2, although the first inductor L1 is formed inside the second inductor L2, formation positions of the first inductor L1 and the second inductor L2 may be reversed. Alternatively, in the example shown in FIG. 2, although the first inductor L1 and the second inductor L2 are concentrically formed, center positions of the first inductor L1 and the second inductor L2 may be different from each other. In other words, the first inductor L1 and the second inductor L2 may be formed to have at least a partial overlapping portion in plan view of a formed region.

In the example shown in FIG. 2, the first inductor L1 and the second inductor L2 are formed in the same wiring layer of the semiconductor device. In the example shown in FIG. 2, a wiring is formed to be spirally counterclockwise from a position at which the first terminal P1 is set. And, this wiring starting from the first terminal P1 is the second inductor L2. The third terminal P3 is set to be drawn out of an end of the wiring configuring the second inductor L2, the end being on a different side from the first terminal P1, by a wiring 41 formed in a wiring layer that is different from that of the wiring configuring the second inductor L2. The wiring configuring the first inductor L1 is formed in an inner region of the wiring configuring the second inductor L2 to be spirally counterclockwise. One end of the wiring configuring the first inductor L1 is connected to a portion of the wiring configuring the second inductor L2, the portion being close to the first terminal P1, by a wiring 42 formed in a wiring layer that is different from a wiring layer where the wiring configuring the first inductor L1 is formed. The other end of the wiring configuring the first inductor L1 is drawn out by a wiring 43 formed in a wiring layer that is different from the wiring layer where the wiring configuring the first inductor L1 is formed, and the second terminal P2 is set in the drawn-out portion.

Spiral directions of the first inductor L1 and the second inductor L2 will be explained here. The spiral directions of the first inductor L1 and the second inductor L2 are determined so that an electrical field generated in the first inductor L1 and an electrical field generated in the second inductor L2 are enhanced by each other when electric current is flown in the first inductor L1 in a direction heading from the first terminal P1 to the second terminal P2 while electric current is flown in the second inductor L2 in a direction heading from the first terminal P1 to the third terminal P3. In other words, the spiral directions of the first inductor L1 and the second inductor L2 are the same as each other. Because of such a form, the mutual conductance M between the first inductor L1 and the second inductor L2 becomes a positive conductance.

Note that a shape of the inductor 31 is not limited to the one shown in FIG. 2. FIG. 3 shows an explanatory diagram of another example of the layout of the inductor according to the first embodiment. An inductor 31a shown in FIG. 3 is formed by flattening the inductor 31 of FIG. 2. In an inductor 31b, a large gap is formed between the wiring configuring the first inductor L1 and the wiring configuring the second inductor L2. The drawing-out directions of the first terminal P1 to the third terminal P3 can appropriately vary depending on a layout of other portions of the applied semiconductor device.

In the semiconductor device 1 according to the first embodiment, the inductor 31 can be made smaller when two inductors are formed so that the formed regions overlap each other than when two inductors having the same inductance are formed in individual regions. For example, when each of the inductance of the first inductor L1 and the inductance of the second inductor L2 is made by a coil having the same inductance, an effect of the area reduction is, for example, about 37%.

Next, the operation and the signal gain of the semiconductor device 1 according to the first embodiment will be explained. FIG. 4 shows an explanatory diagram of the operation of the semiconductor device in the reception mode according to the first embodiment. As shown in FIG. 4, in the reception mode of the semiconductor device 1 according to the first embodiment, the amplifier control circuit 100 brings the receiving amplifier 11 to be in an operation state by turning ON the power switch SW11 while bringing the transmitting amplifier 21 to be in a stoppage state by turning OFF the power switch SW21. In such states, an equivalent circuit of the semiconductor device 1 is as shown in a lower diagram of FIG. 4.

In other words, the equivalent circuit of the semiconductor device 1 in the reception mode generates an input voltage Vi for the impedance-matching circuitry 30 while taking the antenna ANT as a signal source. The impedance of the antenna ANT is expressed as a resistance Ri. The input impedance of the receiving amplifier 11 is expressed as an output impedance Ro of the impedance-matching circuitry 30, and a signal input to the receiving amplifier 11 is expressed as an output voltage Vo based on this output impedance Ro. Further, since the transmitting amplifier 21 is in the stoppage state, the capacitor C2 arranged at the output portion of the transmitting amplifier 21 is connected between the ground terminal and the third terminal P3 of the second inductor L2.

In a frequency property of the impedance-matching circuitry 30 expressed by such an equivalent circuitry, a frequency $f_{notch}$ generating a notch is expressed by an expression (1).

[Numerical Expression 1]

$$fnotch = \frac{1}{2\pi\sqrt{L1 \cdot C2\left(1 - \frac{M}{L2}\right)}} \quad (1)$$

From the expression (1), it is found out in the semiconductor device 1 that the larger the mutual inductance M is, the higher the frequency $f_{notch}$ generating the notch is.

FIG. 5 shows an explanatory diagram of the operation of the semiconductor device in the transmission mode according to the first embodiment. As shown in FIG. 5, in the transmission mode of the semiconductor device 1 according to the first embodiment, the amplifier control circuit 100 brings the transmitting amplifier 21 to be in an operation state by turning ON the power switch SW21 while bringing the receiving amplifier 11 to be in a stoppage state by turning OFF the power switch SW11. In such states, an equivalent circuit of the semiconductor device 1 is as shown in a lower diagram of FIG. 5.

In other words, the equivalent circuit of the semiconductor device 1 in the transmission mode generates the input voltage Vi for the impedance-matching circuitry 30 while taking the transmitting amplifier 21 as a signal source. The output impedance of the transmitting amplifier 21 is expressed as the resistance Ri. The impedance of the antenna ANT is expressed as the output impedance Ro of the impedance-matching circuitry 30, and a voltage generated in the antenna ANT is expressed as the output voltage Vo based on this output impedance Ro. Further, since the receiving amplifier 11 is in the stoppage state, the capacitor C1 arranged at the input portion of the receiving amplifier 11 is connected between the ground terminal and the second terminal P2 of the first inductor L1.

In a frequency property of the impedance-matching circuitry 30 expressed by such an equivalent circuitry, the frequency $f_{notch}$ generating a notch is expressed by an expression (2).

[Numerical Expression 2]

$$fnotch = \frac{1}{2\pi\sqrt{L2 \cdot C1\left(1 - \frac{M}{L1}\right)}} \quad (2)$$

From the expression (2), it is found out in the semiconductor device 1 that the larger the mutual inductance M is, the higher the frequency $f_{notch}$ generating the notch is.

As seen from the equations (1) and (2), in the semiconductor device 1 according to the first embodiment, the frequency generating the notch can be made high when the inductor 31 is configured to generate the mutual inductance M. When the frequency generating the notch is high, the gain at, for example, the frequency of 2.5 GHz defined by BLE (Bluetooth Low Energy: registered trademark) can be improved by about 1.0 dB in the reception mode or about 0.2 dB in the transmission mode.

In the above-described explanation, in the semiconductor device 1 according to the first embodiment, the signal loss at the impedance-matching circuitry 30 can be reduced since the first inductor L1 transmitting the signal from the antennal ANT to the receiving circuitry 10 and the second inductor L2 transmitting the signal from the transmitting circuitry 20 to the antennal ANT are formed to mutually include the mutual inductance M.

And, the circuitry area that is necessary for the formation of the two inductors can be reduced since the first inductor L1 and the second inductor L2 are formed to include an overlapping portion in plan view.

In other words, in the semiconductor device 1 according to the first embodiment, the circuitry area can be reduced while the signal gain is increased.

Second Embodiment

Figure 6:
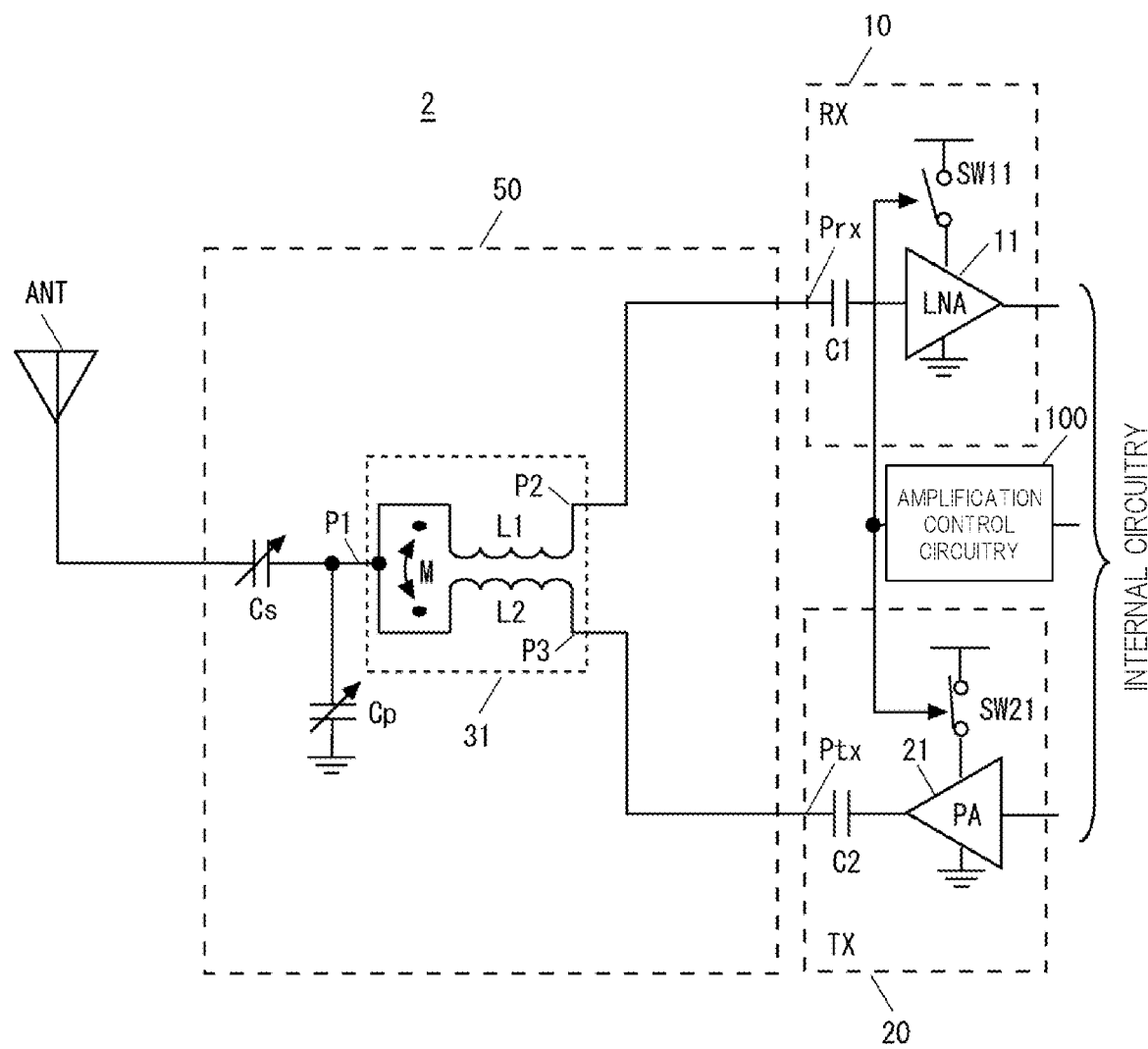
FIG. 6 is a circuitry diagram of a semiconductor device according to a second embodiment.

In the second embodiment, an impedance-matching circuitry 50 that is another aspect of the impedance-matching circuitry 30 in the semiconductor device 1 according to the first embodiment will be explained. FIG. 6 shows a circuitry diagram of a semiconductor device 2 according to a second embodiment.

As shown in FIG. 6, the impedance-matching circuitry 50 is formed by adding a second variable capacity Cs to the impedance-matching circuitry 30. One terminal of the second variable capacity Cs is connected both to a node of the first variable capacity Cp close to the first terminal P1 and to the first terminal P1, and the other terminal of the same is connected to the antenna ANT.

Figure 7:
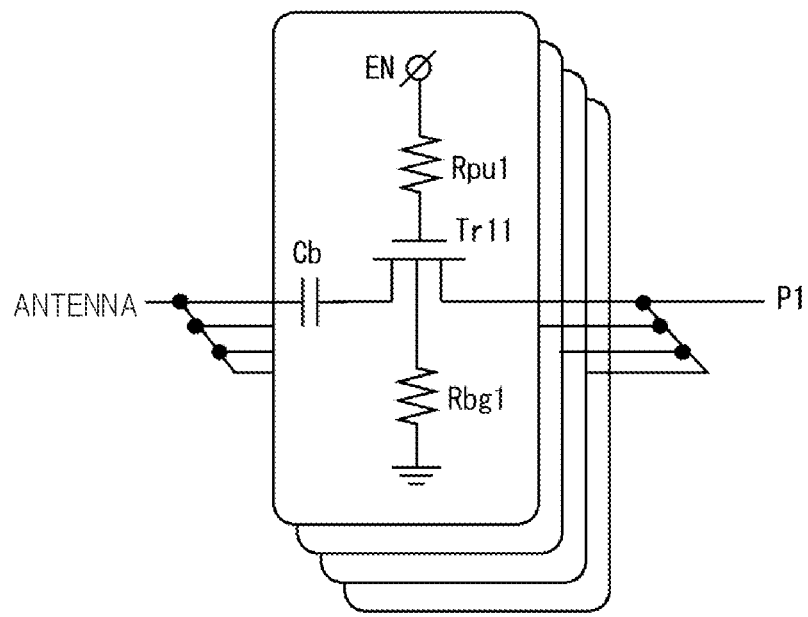
FIG. 7 is a circuitry diagram of a second variable capacity according to the second embodiment.

A specific circuitry configuration example of the second variable capacity Cs will be explained here. FIG. 7 shows a circuitry diagram of the second variable capacity Cs according to the second embodiment. As shown in FIG. 7, in the second variable capacity Cs, at least one of variable capacity units that are connected in parallel is enabled by a selection signal EN. Each unitary capacity unit includes a capacitor Cb, a transistor Tr11, and resistors Rpu1 and Rbg1.

One end of the capacitor Cb is connected to the antenna ANT, and the other end of the same is connected to a source of the transistor Tr11. A drain of the transistor Tr11 is connected to the first terminal P1 and to a terminal of the first variable capacity Cp close to the first terminal P1. The selection signal EN is supplied to a gate of the transistor Tr11 through the resistor Rpu1. A back gate of the transistor Tr11 is connected to the ground terminal through the resistor Rbg1. When each resistor is inserted in the gate and the back gate as described above, a conduction state of the transistor Tr11 is maintained while the transistor Tr11 functions as a switch even when an amplitude of the signal passing the transistor Tr11 exceeds the ground voltage (or the potential Vb fixed in terms of the alternating current) or a high-level potential Vg of the selection signal EN.

Figure 8:
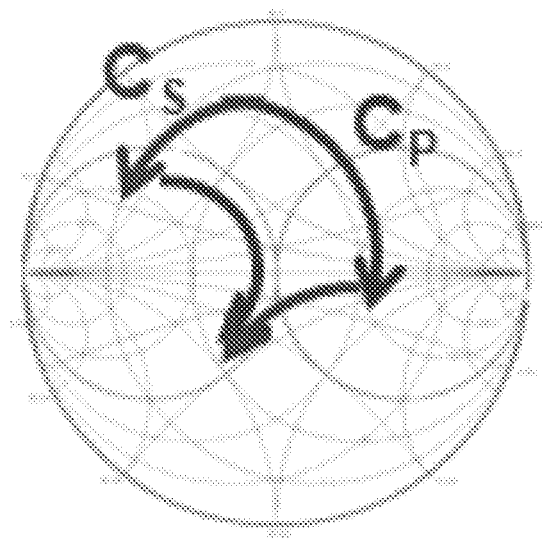
FIG. 8 is an emittance chart for explaining an impedance variable range of the semiconductor device according to the second embodiment.

Since the impedance-matching circuitry 50 includes the second variable capacity Cs, the impedance variable range can be widened. FIG. 8 shows an emittance chart for explaining the impedance variable range of the semiconductor device 2 according to the second embodiment. As shown in FIG. 8, while the impedance variable range in the case with only the first variable capacity Cp is a range along one conductance contour line, the impedance variable range in the case with the addition of the second variable capacity Cs can be set over a plurality of conductance contour lines.

In the above-described explanation, when the impedance-matching circuitry 50 according to the second embodiment is used, the wider impedance tuning range than that of the first embodiment can be set to widen the impedance adjusting ability even in the direction of the reduction of the impedance.

Third Embodiment

Figure 9:
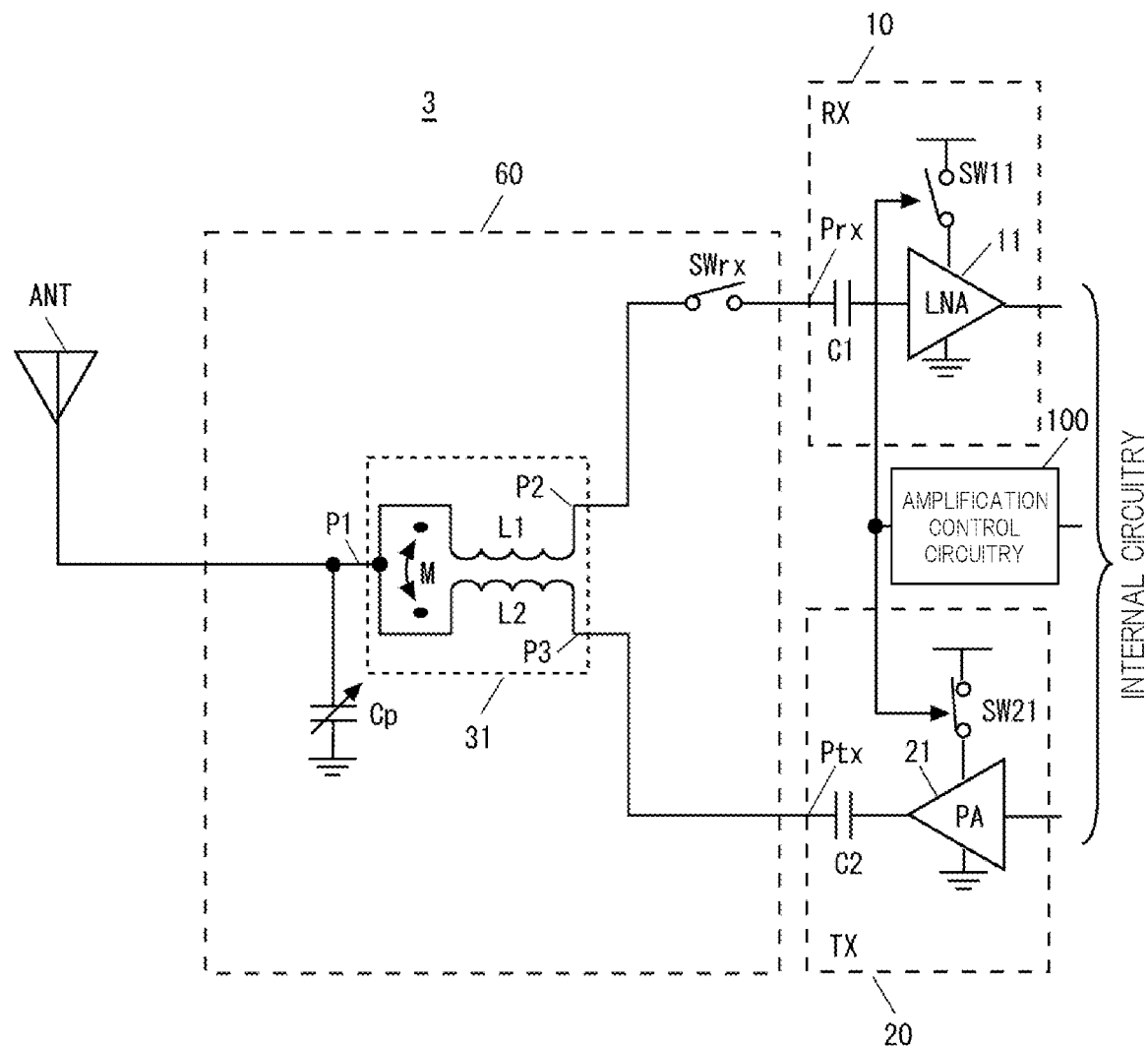
FIG. 9 is a circuitry diagram of a semiconductor device according to a third embodiment.

In the second embodiment, an impedance-matching circuitry 60 that is another aspect of the impedance-matching circuitry 30 in the semiconductor device 1 according to the first embodiment will be explained. FIG. 9 shows a circuitry diagram of a semiconductor device 3 according to a third embodiment.

Figure 10:
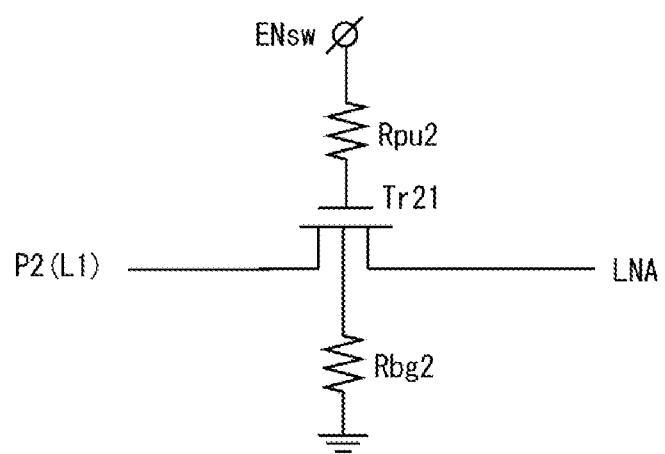
FIG. 10 is a circuitry diagram of a switch circuit used in the semiconductor device according to the third embodiment.

As shown in FIG. 9, the impedance-matching circuitry 60 is formed by adding a switch circuitry SWrx to the impedance-matching circuitry 30. The switch circuitry SWrx switches whether to connect or disconnect the second terminal P2 and the input terminal Prx of the receiving circuit 10. FIG. 10 shows a circuitry diagram of the switch circuit SWrx used in the semiconductor device 3 according to the third embodiment.

As shown in FIG. 10, a transistor Tr21 and resistors Rpu2 and Rbg2 are provided. A source of the transistor Tr21 is connected to the second terminal P2 of the inductor 31, and a drain of the same is connected to the receiving circuit 10. A switch control signal ENsw is supplied to a gate of the transistor Tr21 through the resistor Rpu2. A back gate of the transistor Tr21 is connected to the ground terminal through the resistor Rbg2. When each resistor is inserted in the gate and the back gate as described above, a conduction state of the transistor Tr11 is maintained while the transistor Tr21 functions as a switch even when an amplitude of the signal passing the transistor Tr21 exceeds the ground voltage (or the potential Vb fixed in terms of the alternating current) or the high-level potential Vg of the selection signal EN.

Since the switch circuitry SWrx is arranged as described above, the influence of the capacitor C2 arranged in the region of the receiving circuitry 10 can be reduced in the transmission mode. In order to reduce the loss due to the insertion of the switch circuitry SWrx, it is preferable to select a transistor having a certain large gate width. The electrical floating state is needed by the insertion of the resistors in the gate node and the back gate of the transistor Tr11. By the resistors, parasitic capacitances of the corresponding gate and the corresponding back gate viewed from the source and the drain can be reduced.

Fourth Embodiment

Figure 11:
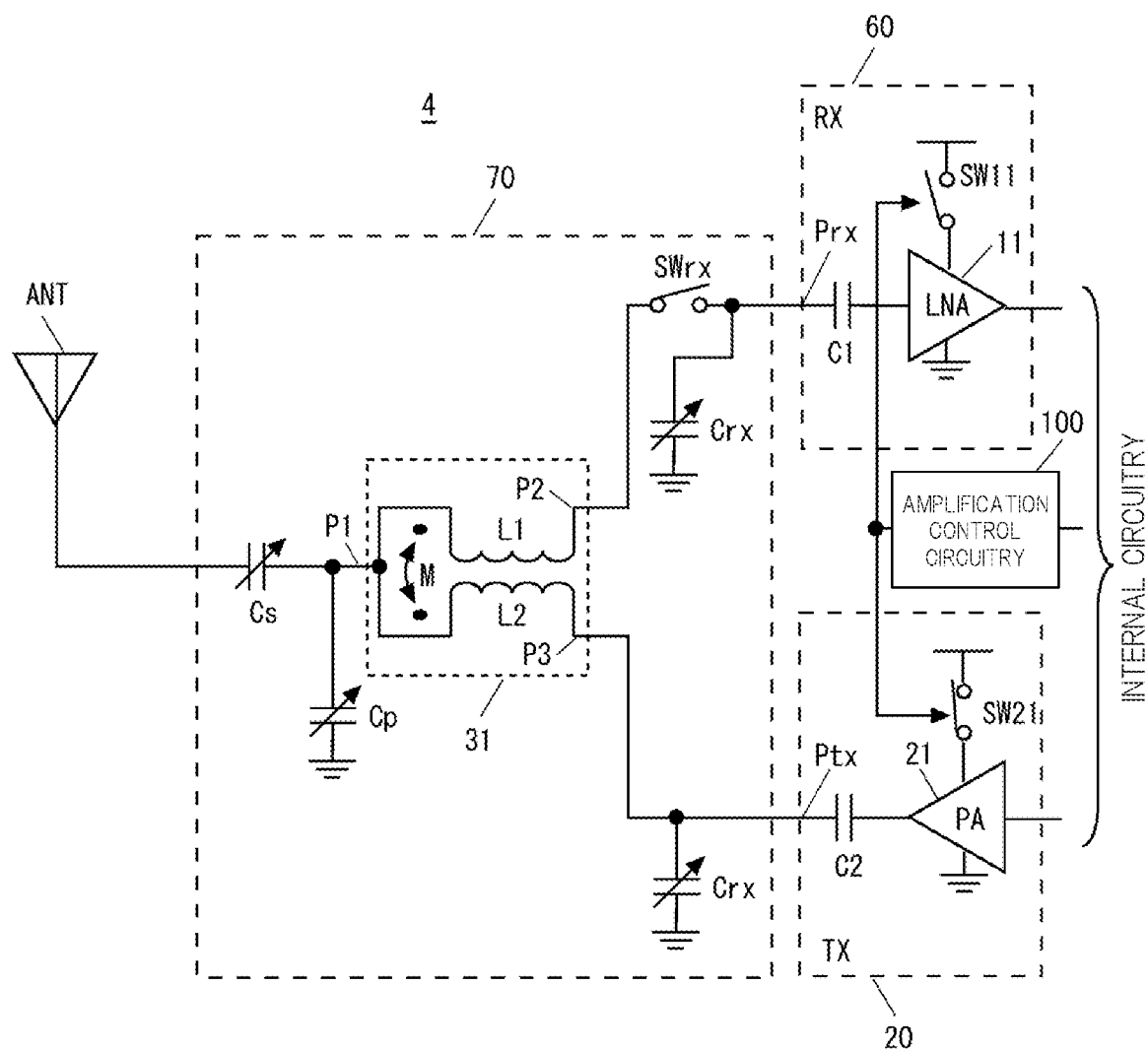
FIG. 11 is a circuitry diagram of a semiconductor device according to a fourth embodiment.

In the fourth embodiment, an impedance-matching circuitry 70 that is another aspect of the impedance-matching circuitry 30 in the semiconductor device 1 according to the first embodiment will be explained. FIG. 11 shows a circuitry diagram of a semiconductor device 4 according to the fourth embodiment.

As shown in FIG. 11, the impedance-matching circuitry 70 is formed by adding the second variable capacity Cs, the switch circuitry SWrx, a third variable capacity Crx and a fourth variable capacity Ctx to the impedance-matching circuitry 30. The second variable capacity Cs is as explained in the second embodiment, and the switch circuitry SWrx is as explained in the third embodiment, and therefore, the explanation for them is omitted here. The third variable capacity Crx and the fourth variable capacity Ctx will be explained in detail.

The third variable capacity Crx is connected between the input terminal Prx of the receiving circuitry 10 and the fixed potential terminal (such as the ground terminal) having the fixed potential in terms of the alternating current. The fourth variable capacity Ctx is connected between the output terminal Ptx of the transmitting circuitry 20 and the ground terminal. Note that the third variable capacity Crx and the fourth variable capacity Ctx have the same configuration as that of the second variable capacity Cs.

In the semiconductor device 4 according to the fourth embodiment, the impedance variable range can be made further wider than that of the second embodiment since the second variable capacity Cs, the third variable capacity Crx and the fourth variable capacity Ctx are arranged in the first terminal P1, the second terminal P2 and the third terminal P3, respectively.

Fifth Embodiment

Figure 12:
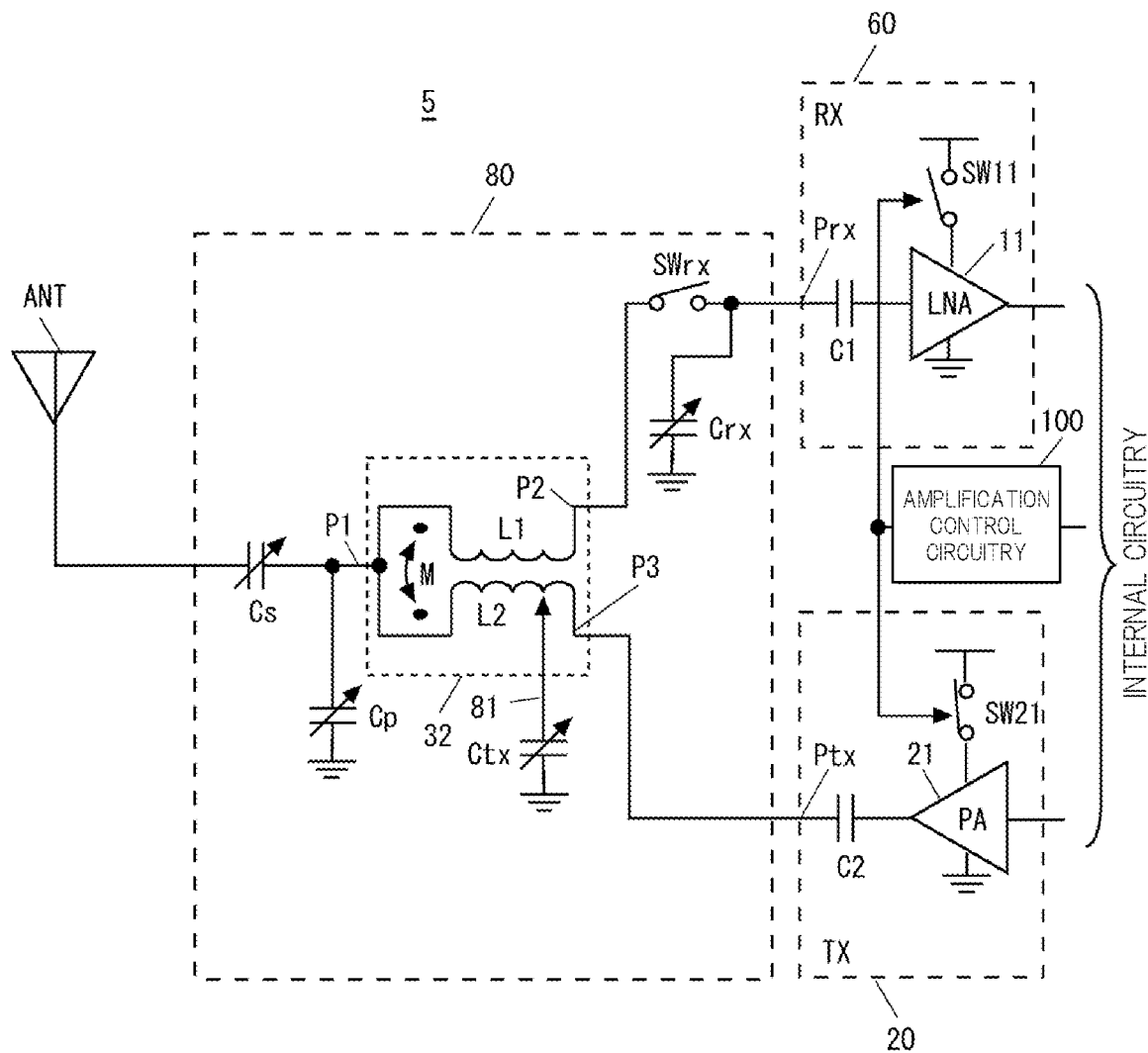
FIG. 12 is a circuitry diagram of a semiconductor device according to a fifth embodiment.

In the fifth embodiment, an impedance-matching circuitry 80 that is another aspect of the impedance-matching circuitry 70 in the semiconductor device 4 according to the fourth embodiment will be explained. FIG. 12 shows a circuitry diagram of a semiconductor device 5 according to the fifth embodiment.

As shown in FIG. 12, in the impedance-matching circuitry 80, the fourth variable capacity Ctx is connected to a middle position of the wiring configuring the second inductor L1 except for an end position. Even in the impedance-matching circuitry 80, note that the other end of the fourth variable capacity Ctx is connected to the fixed potential terminal (such as the ground terminal). The inductor 31 including a branch wiring 81 connecting the second inductor L2 and the fourth variable capacity Ctx as described above is referred to as an inductor 32.

Figure 13:
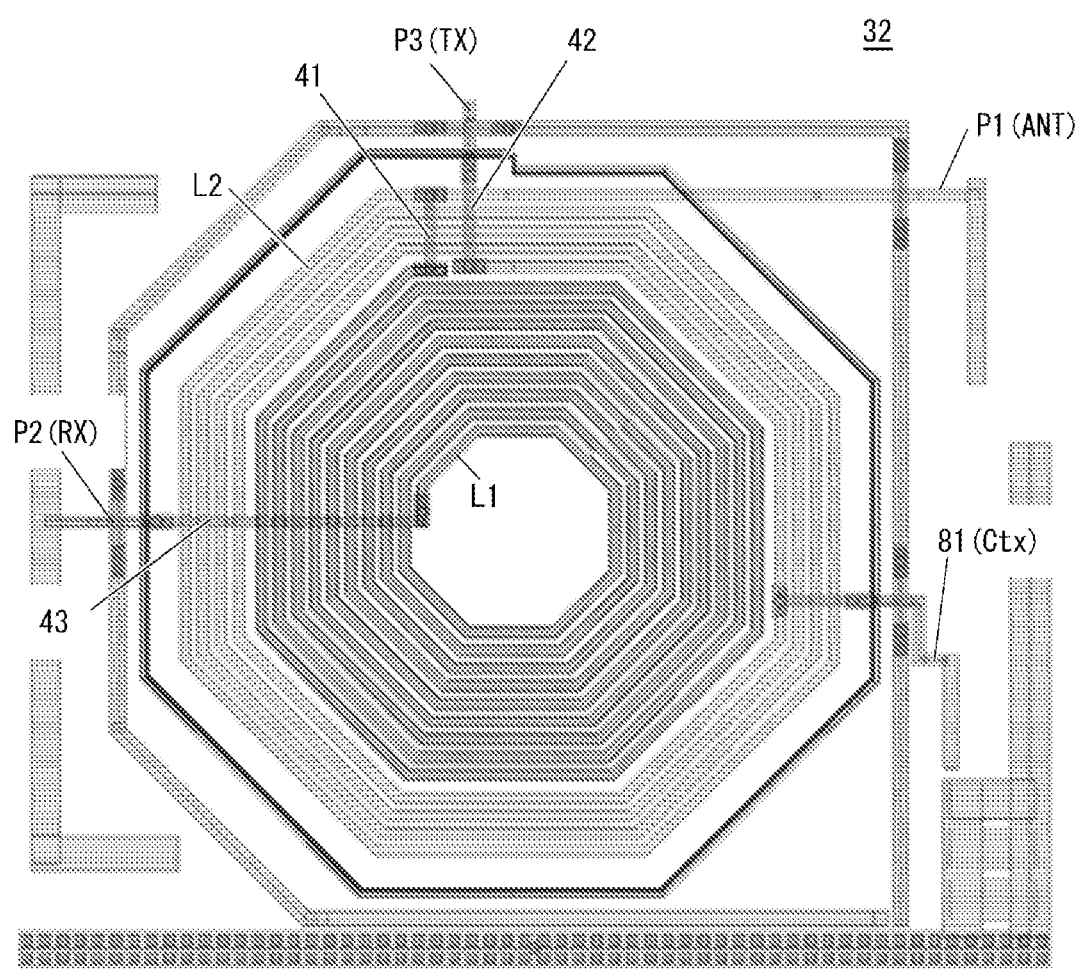
FIG. 13 is an explanatory diagram of a layout of an inductor according to the fifth embodiment.

As a layout of the inductor 32, FIG. 13 shows an explanatory diagram of the layout of the inductor 32 according to the fifth embodiment. As shown in FIG. 13, in the inductor 32, the branch wiring 81 branches from the middle position of the wiring configuring the second inductor L2 except for the end position. The branch wiring 81 is formed in a different layer from the wiring layer where the wiring configuring the second inductor L2 is formed.

As described above, the fourth variable capacity Ctx is also connectable to the wiring configuring the second inductor L2. Even in such a layout, there is hardly a difference in the property from the fourth embodiment. Therefore, such a layout is also applicable in accordance with convenience for layout of other components.

Sixth Embodiment

Figure 14:
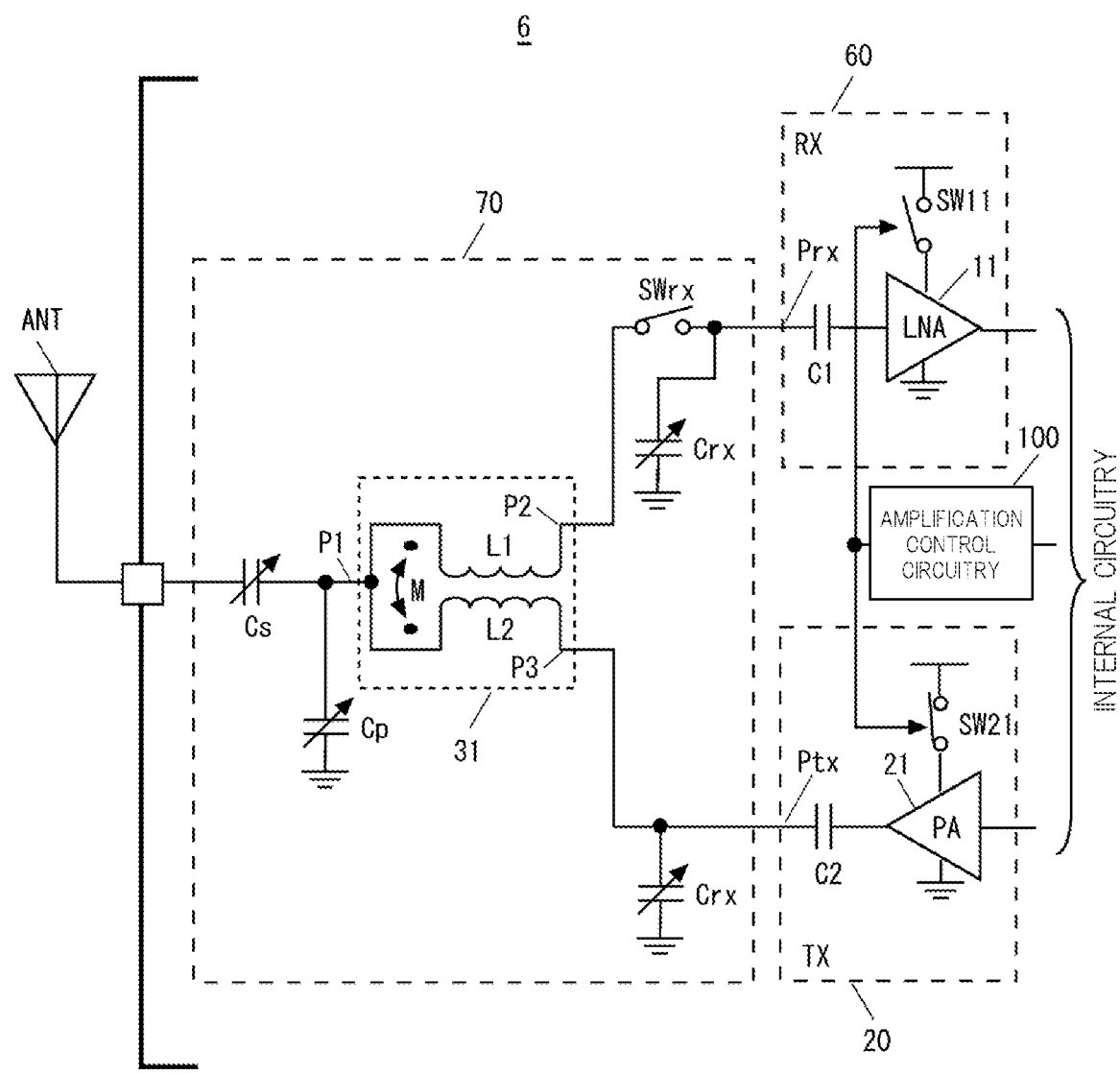
FIG. 14 is a circuitry diagram of a semiconductor device according to a sixth embodiment.

In the sixth embodiment, another aspect of the semiconductor device 4 according to the fourth embodiment will be explained. FIG. 14 shows a circuitry diagram of a semiconductor device 6 according to the sixth embodiment. Each of all the receiving circuitry 10, the transmitting circuitry 20 and the impedance-matching circuitries 30, 50, 60, 70 and 80 explained in the first to the fifth embodiments is made of only a component allowed to be formed on the semiconductor chip. Therefore, in the sixth embodiment, in the example of the semiconductor device 4 according to the fourth embodiment, an example of formation of the receiving circuitry 10, the transmitting circuitry 20 and the impedance-matching circuitry 70 on one semiconductor chip will be described.

When the receiving circuitry 10, the transmitting circuitry 20 and the impedance-matching circuitry 70 are formed on one semiconductor chip as described above, the number of external components of the semiconductor chip for the components configuring the transmitting/receiving circuitries can be reduced, and therefore, a volume of the device including the transmitting/receiving circuitries can be reduced.

Seventh Embodiment

Figure 15:
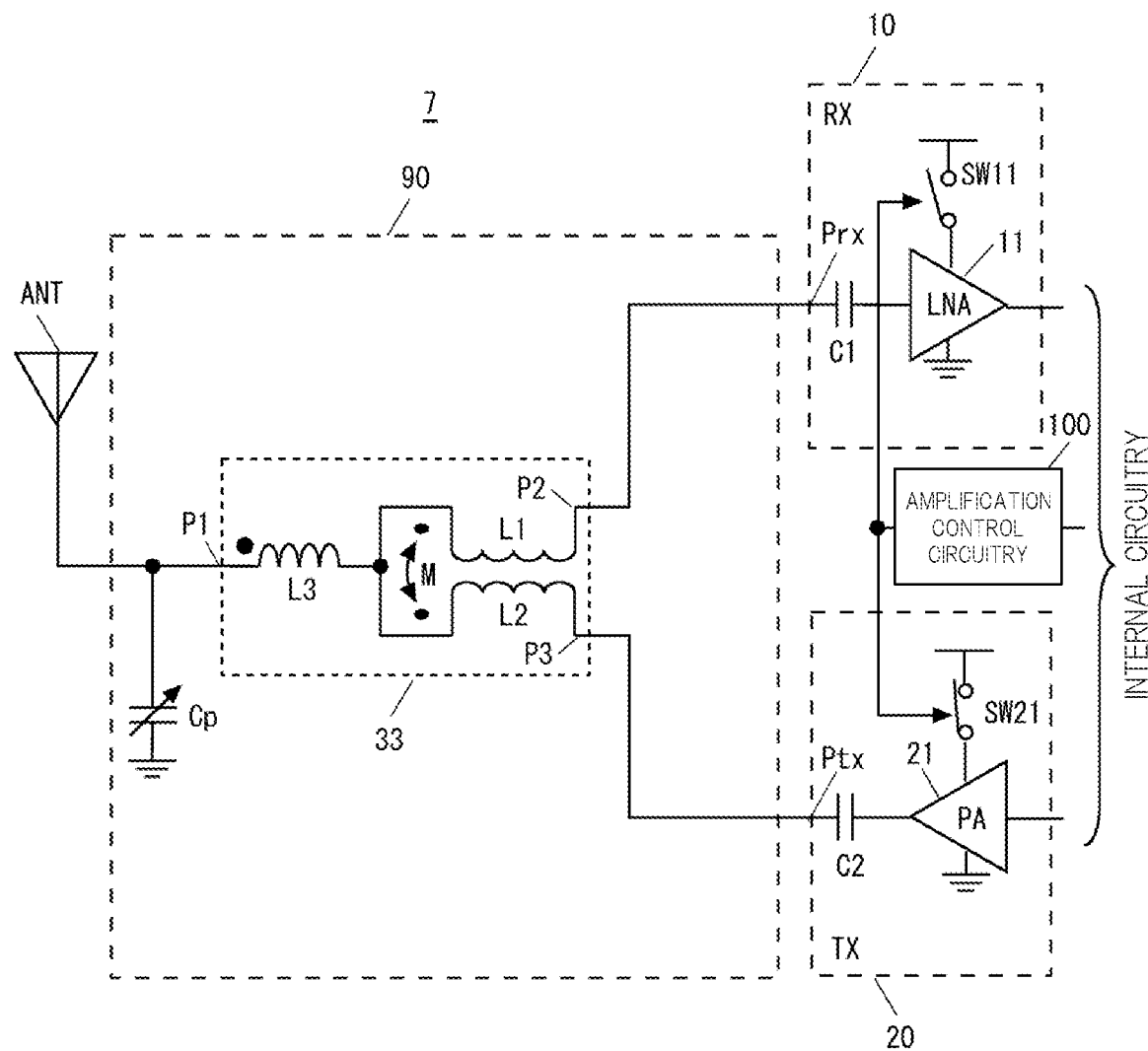
FIG. 15 is a circuitry diagram of a semiconductor device according to a seventh embodiment.

In the seventh embodiment, a semiconductor device 7 including an inductor 33 that is another aspect of the inductor 31 will be explained. FIG. 15 shows a circuitry diagram of the semiconductor device according to the seventh embodiment.

Figure 16:
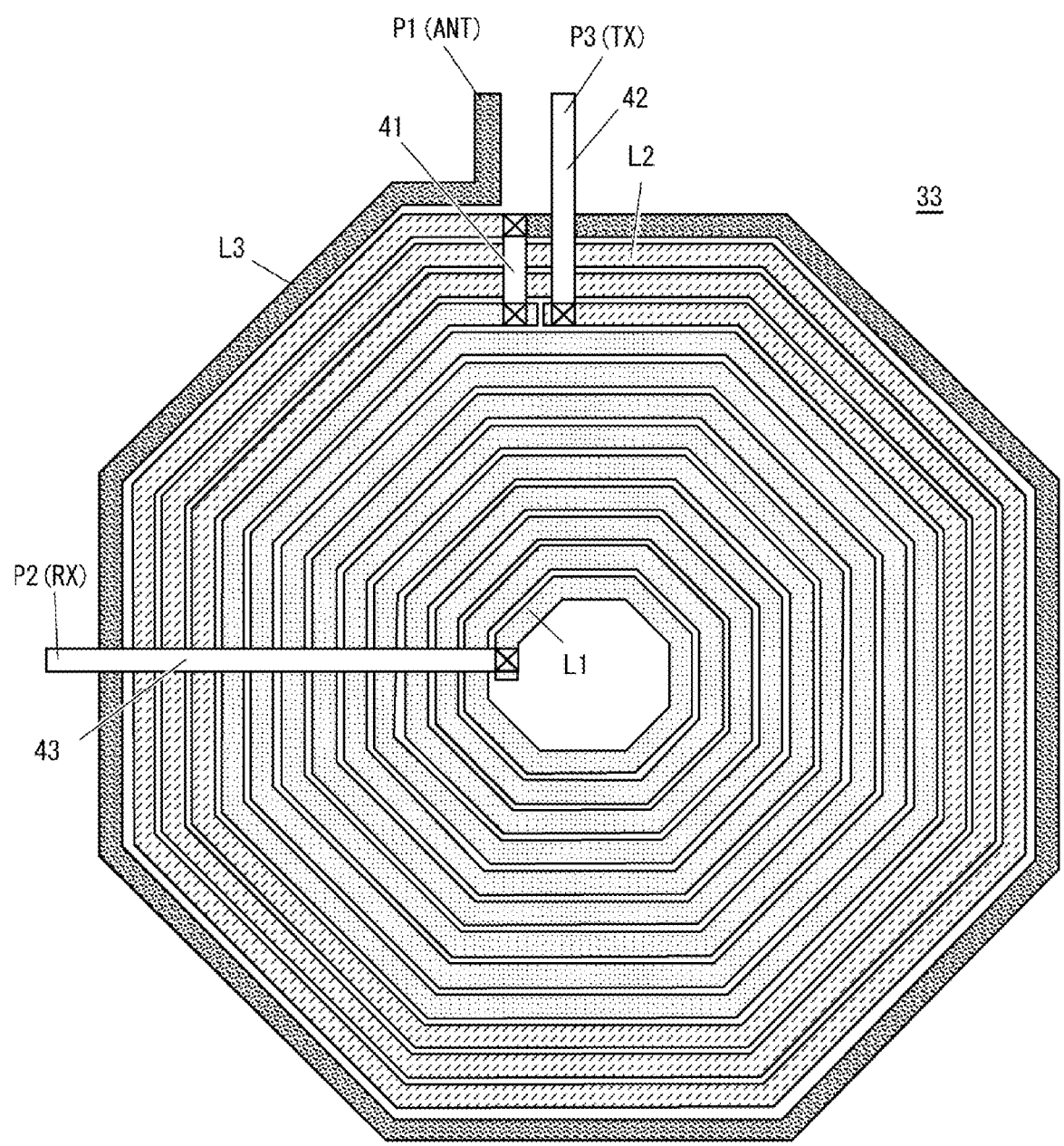
FIG. 16 is an explanatory diagram of a layout of an inductor according to the seventh embodiment.

As shown in FIG. 15, the inductor 33 is formed by adding a third inductor L3 to the inductor 31. The third inductor L3 is connected between the first terminal P1 and a shared branch to which both the first inductor L1 and the second inductor L2 are connected. FIG. 16 shows an explanatory diagram of a layout of the inductor according to the seventh embodiment.

As shown in FIG. 16, in the inductor 33, a wiring configuring the third inductor L3 is formed to surround the wiring configuring the second inductor L2 while spiraling in the same direction as those of the first inductor L1 and the second inductor L2. In the inductor 33, the first terminal P1 of the third inductor L3 is set, and the first inductor L1 is formed to branch from a portion near its other end. The second inductor L2 is formed to be continuously formed from an end of the third inductor L3.

If the third inductor L3 is necessary for the inductance of the formed inductor or the mutual inductance M, the third inductor L3 is formed in the layout shown in FIG. 16, and the mutual inductance M can be generated between the third inductor L3 and the first and second inductors L1 and L2.

In the foregoing, the invention made by the present inventors has been concretely described on the basis of the embodiments. However, it is needless to say that the present invention is not limited to the foregoing embodiments, and various modifications can be made within the scope of the present invention.

What is claimed is:

1. A semiconductor device comprising:
a receiving circuitry;
a transmitting circuitry;
an amplification control circuitry configured to exclusively operate the receiving circuitry and the transmitting circuitry; and
an impedance-matching circuitry including a first terminal connected to an antenna, a second terminal connected to an input terminal of the receiving circuitry, and a third terminal connected to an output terminal of the transmitting circuitry,
wherein the impedance-matching circuitry further includes:
a first inductor arranged in a signal path extending from the first terminal to the second terminal;
a second inductor arranged in a signal path extending from the first terminal to the third terminal, and wherein, in plan view of a region where the first inductor and the second inductor are formed, the first inductor and the second inductor have at least a partial overlapping portion;
a first variable capacity connected between the first terminal and a fixed potential terminal having a fixed potential in terms of alternating current; and
a second variable capacity, one terminal of the second variable capacity is connected to both a node of the first variable capacity proximate to the first terminal and the first terminal and the other terminal of the second variable capacity is connected to the antenna.

2. The semiconductor device according to claim 1, wherein spiral directions of the first inductor and the second inductor are set so that an electrical field generated in the first inductor and an electrical field generated in the second inductor are enhanced by each other when electric current is flown in the first inductor in a direction heading from the first terminal to the second terminal while electric current is flown in the second inductor in a direction heading from the first terminal to the third terminal.

3. The semiconductor device according to claim 1, further comprising:
a switch circuitry configured to switch whether to connect or disconnect the second terminal and an input terminal of the receiving circuitry.

4. The semiconductor device according to claim 1, further comprising:
a third variable capacity connected between an input terminal of the receiving circuitry and a fixed potential terminal having a fixed potential in terms of alternating current; and
a fourth variable capacity connected between an output terminal of the transmitting circuitry and the fixed potential.

5. The semiconductor device according to claim 1, further comprising:
a third variable capacity connected between an input terminal of the receiving circuitry and a fixed potential terminal having a fixed potential in terms of alternating current; and
a fourth variable capacity, one terminal of which is connected to a middle position of a wiring configuring the second inductor except for an end portion and the other terminal of which is connected to the fixed potential terminal.

6. The semiconductor device according to claim 1, further comprising:
a third inductor connected between the first terminal and a shared branch connected to both the first inductor and the second inductor,
wherein the third inductor is formed to include a mutual inductance between the first inductor and the second inductor.

7. The semiconductor device according to claim 1, wherein the receiving circuitry, the transmitting circuitry, the amplification control circuitry and the impedance-matching circuitry are formed on one semiconductor chip.

8. An impedance-matching circuitry comprising:
a first terminal connected to an antenna;
a second terminal connected to an input terminal of a receiving circuitry;
a third terminal connected to an output terminal of a transmitting circuitry;
a first inductor arranged in a signal path extending from the first terminal to the second terminal;
a second inductor arranged in a signal path extending from the first terminal to the third terminal, wherein, in plan view of a region where the first inductor and the second inductor are formed, the first inductor and the second inductor have at least a partial overlapping portion;
a first variable capacity connected between the first terminal and a fixed potential terminal having a fixed potential in terms of alternating current; and
a second variable capacity, one terminal of the second variable capacity is connected to both a node of the first variable capacity proximate to the first terminal and the first terminal and the other terminal of the second variable capacity is connected to the antenna.

* * * * *